United States Patent [19]

Stern

[11] Patent Number: 5,597,280
[45] Date of Patent: Jan. 28, 1997

[54] LOCKING CLIP WITH RESILIENT BARB ARM

[75] Inventor: Eric J. Stern, Farmington Hills, Mich.

[73] Assignee: Yazaki Corporation, Tokyo, Japan

[21] Appl. No.: 550,378

[22] Filed: Oct. 30, 1995

[51] Int. Cl.[6] .......................... F16B 19/00; F16B 15/00; F16B 45/00
[52] U.S. Cl. .......................... 411/508; 411/913; 248/71; 24/453
[58] Field of Search .................................. 411/508, 509, 411/510, 913; 248/71, 74.3; 24/453

[56] References Cited

U.S. PATENT DOCUMENTS

| | | | |
|---|---|---|---|
| 2,618,033 | 11/1952 | Tinnerman et al. | 248/71 X |
| 3,342,095 | 9/1967 | Buntic | 411/508 |
| 3,473,768 | 10/1969 | Piasecki | 248/71 X |
| 3,621,751 | 11/1971 | Fiorentino | 24/453 X |
| 4,708,895 | 11/1987 | Mizusawa | 24/453 |
| 4,924,561 | 5/1990 | Yoneyama | 24/453 |
| 5,084,944 | 2/1992 | Hileman | 411/508 X |

*Primary Examiner*—Neill R. Wilson
*Attorney, Agent, or Firm*—Young & Basile, P.C.

[57] ABSTRACT

A bayonet-type fastener especially adapted for securing wiring harnesses at predetermined locations within vehicle bodies. A half-arrowhead; i.e., single barb bayonet fastener is formed of flat ribbon stock such as plastic to define an open sided hollow body in which the base legs lie in spaced parallel relationship, a cam surface for insertion purposes is formed on the outer surface of the barb arm, and the barb arm terminates in a retention leg which also lies in spaced parallel relationship to both of the base legs. The entire structure compresses when thrust through an approximately sized aperture and thereafter reexpands to prevent or inhibit removal. The single barb eliminates the ambiguity arising from multiple audible clicks associated with multiple barb type fasteners.

9 Claims, 2 Drawing Sheets

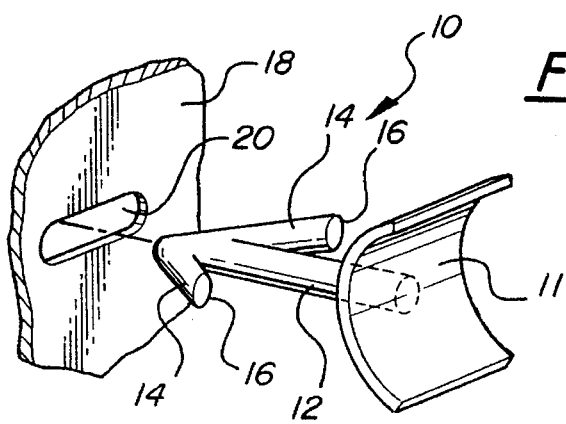
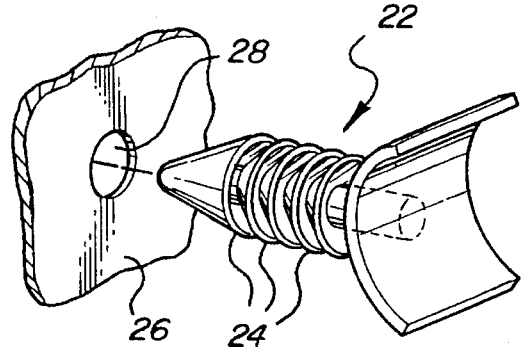
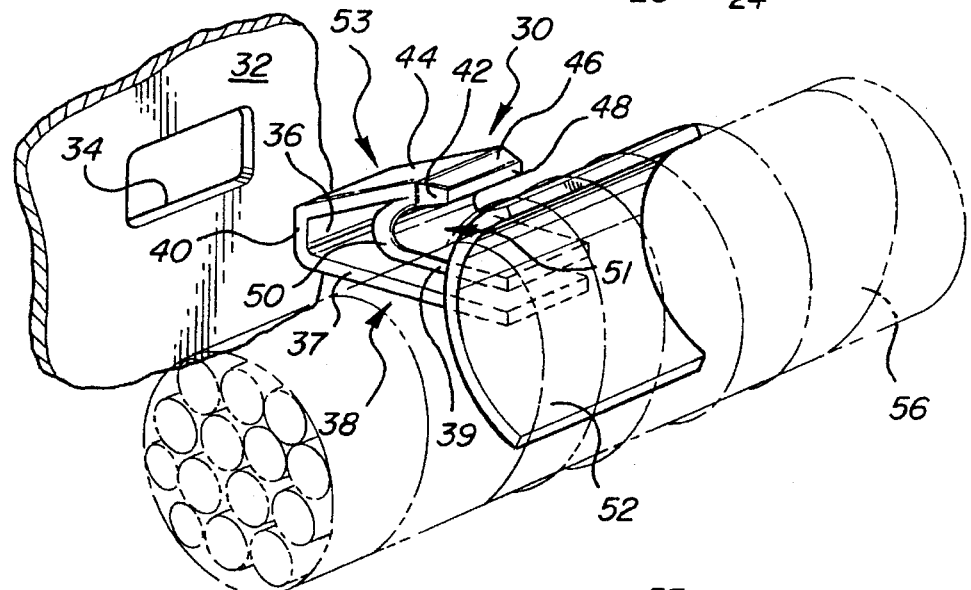
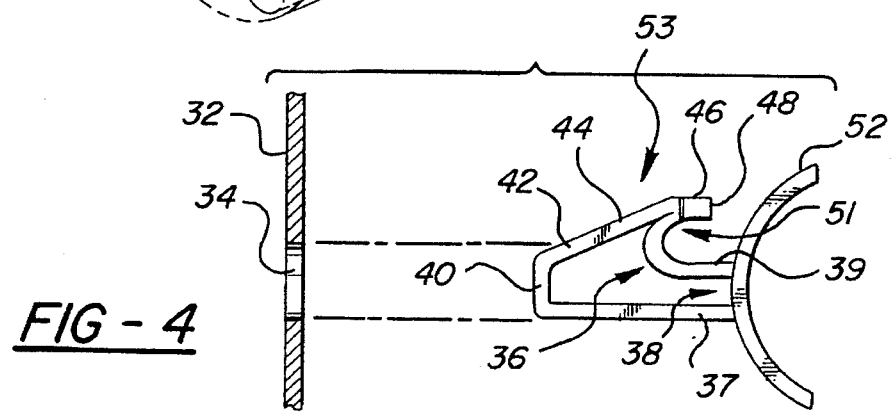

5,597,280

LOCKING CLIP WITH RESILIENT BARB ARM

FIELD OF THE INVENTION

The present invention relates to bayonet-type fasteners, sometimes called locking clips, for securing a first component such as a wire bundle to a vehicle panel having a mounting aperture into which a portion of the fastener is inserted.

BACKGROUND OF THE INVENTION

Automotive vehicle wiring harnesses, comprising wire bundles and electrical connectors, are commonly secured at various points throughout the vehicle body by means of bayonet-type fasteners which are taped or otherwise fastened to the harness and which include a barb or "Christmas tree" which is designed to be thrust through a hole in a body panel. The barb is resilient so as to close up to allow insertion and to expand after insertion to prevent or inhibit removal.

FIG. 1 illustrates a prior art "arrowhead" clip 10 comprising a solid shaft 12 having converging end barbs 14 at one end and a semi-cylindrical flange 11 at the other end. The flange is designed to be taped to a wire bundle and the barbs 14 are designed to be resiliently thrust through an aperture 20 formed in a vehicle body panel 18. The barbs 14 flex toward one another for insertion and thereafter spring outwardly to cause second surfaces 16 to abut the interior surface of the panel 18 to prevent or inhibit removal. The clip 10 is typically made of plastic.

Because the prior art arrowhead clip 10 has two barbs 14, it may be incompletely installed; i.e., an operator may believe that the clip is fully inserted upon hearing a "click" sound. However, this clicking sound may be created by a single lock projection 14 engaging the panel, while the other lock projection has not passed through the aperture. Therefore, the audible click provided by this connector does not always indicate a proper installation.

FIG. 2 illustrates a prior art "Christmas tree" clip 22 having a flange for securing the clip to the wiring harness. A series of locking conical projections 24 extend from the clip and function to secure the clip within aperture 28 in panel 26. As with the arrowhead clip, this Christmas tree clip suffers from the same problems associated with partial insertion of the clip. Here, each time a locking projection 24 passes through aperture 28, an audible "click" is heard. However, proper installation requires that the clip be fully inserted through the aperture, resulting in numerous audible clicks. Since these clips are often installed in concealed locations, it may be difficult for an operator to visually inspect the mounting of the clip.

Therefore, it is desirable to provide a locking clip which provides a strong retention force, and which provides to the assembler a fool-proof, unequivocal audible signal when the clip has been properly and fully inserted.

SUMMARY OF THE INVENTION

The present invention provides a bayonet-type fastener or locking clip for use, for example, in securing a wire bundle to a vehicle panel which overcomes problems associated with prior art clips, which eliminates the ambiguity associated with the audible responses of multiple barb clips, yet which provides a strong retention force and durability. In general, this is achieved through the provision of a bayonet-type fastener which is made of flat, ribbon stock, preferably plastic, formed to produce a hollow beam structure having a single resilient barb. The flat stock, in final form, is bent back on itself to form a "half-arrowhead" barb in which the elements of stock are spaced apart such that there is resilience not only in the barb but also in the base. The barb provides a wide, flat cam surface for entry into the receiving aperture and a wide flat retaining edge to prevent or inhibit removal.

In a preferred form, the fastener comprises in addition to a hollow, half-arrowhead portion, an integral attachment portion in the form of an arcuate flange which may be taped to a wire bundle in conventional fashion.

Alternatively, the attachment mechanism may be a strap having opposite ends with the locking clip base portion attached midway between the strap ends. The ends of the strap are secured to one another around the first component.

The resilient barb arm of the locking clip is capable of being displaced between an extended position and a compressed position. The arcuate surface of the resilient barb arm acts as a spring to bias the barb arm in the extended position. The resilient arm cam surface displaces the resilient barb arm from the extended position to the compressed position when the locking clip is inserted into the mounting aperture in the second component. Because the locking clip is hollow, it permits compression deformation of the locking clip body as well as the resilient barb arm.

BRIEF DESCRIPTION OF THE DRAWINGS

FIG. 1 is a perspective view of a prior art arrowhead mounting clip and a vehicle panel;

FIG. 2 is a perspective view of a prior art "Christmas tree" mounting clip;

FIG. 3 is a perspective view of a locking clip according to the present invention and a vehicle panel having a mounting aperture;

FIG. 4 is a side view of the locking clip shown in FIG. 3, prior to installation;

DETAILED DESCRIPTION OF THE PREFERRED EMBODIMENT

Figure 5:
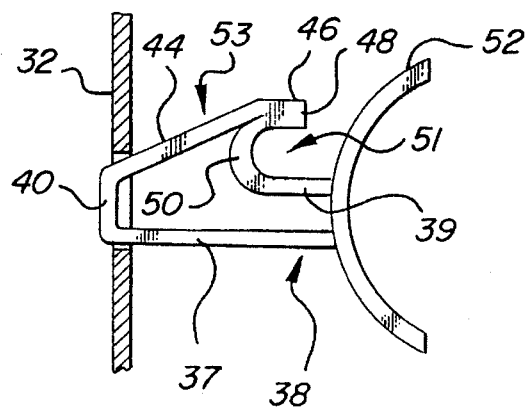
FIG. 5 is a side view of the locking clip as it enters the vehicle panel mounting aperture.

FIG. 3 illustrates a first embodiment of the locking clip 30. Clip 30 is preferably molded from a flat stock of plastic material such as nylon. Clip 30 is mounted to panel 32 containing an aperture 34. Panel 32 may be a vehicle body panel, or may be a panel attached to a vehicle component. Locking clip 30 is generally hook-shaped and has a hollow interior 36 extending laterally through the locking clip.

Clip 30 includes a hollow, open-sided base portion 38 defined by parallel first and second legs 37,39 respectively and extending along a longitudinal axis. An end segment 40 is continuous with the first leg 37 and extends therefrom at a right angle. End segment 40 has vertical and horizontal dimensions which are less than those of aperture 34, thereby permitting the end segment to pass through the aperture with little or no resistance. A resilient barb arm 42 is continuous with end segment 40, and extends back partially toward a taping flange 52. Taping flange 52 is integrally molded with the locking clip and has an arcuate shape. The shape of flange 52 conforms generally with the shape of wiring harness 56.

Barb arm 42 provides a cam surface 44 extending from end segment 40 at an oblique angle to the longitudinal axis of base portion 38 to provide a shape resembling a "half-arrowhead." A retention leg 46 is continuous with cam surface 44 and located at the end of barb arm 42 opposite end segment 40. A planar retention surface 48 is located at the end of retention leg 46 and is substantially perpendicular to the longitudinal axis of base portion 38. An arcuate segment 50 extends from barb arm 42 and connects with second leg 39, thereby creating a concave cavity 51 between retention leg 46 and second leg 39.

Figure 6:
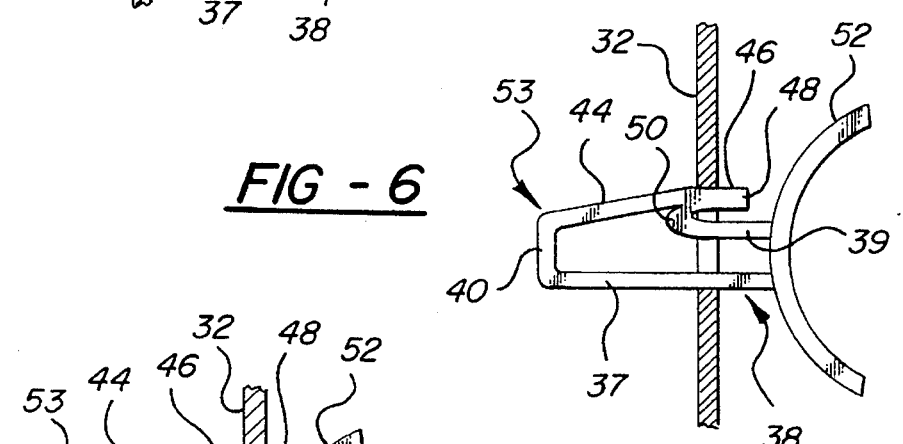
FIG. 6 is a side view of the locking clip partially inserted into the mounting aperture.
Figure 7:
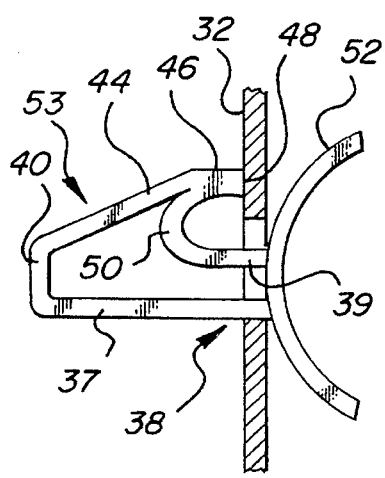
FIG. 7 is a side view of the locking clip fully inserted and locked to the vehicle panel.

End segment 40, barb arm 42, retention leg 46, and arcuate segment 50 together comprise a barb portion 53 which engages panel 32 in the manner described below. As shown in FIG. 3, barb arm 42 has a normally extended position, which is maintained by the spring action of arcuate segment 50. However, barb arm 42 may be displaced to a compressed position, as shown in FIG. 6. This figure shows that retention leg 46 is compressed toward second leg 39 and, at the same time, barb arm 42 is compressed toward first leg 37, flattening arcuate segment 50. The half-arrowhead barb portion 53 passes through aperture 34 until the barb arm 42 and retention leg 46 clear the interior surface of the panel. Thereafter further insertion allows the barb arm to spring outwardly as shown in FIG. 7 to produce a single, unambiguous audible click and to securely hold the clip and the associated wire bundle in place.

Figure 8:
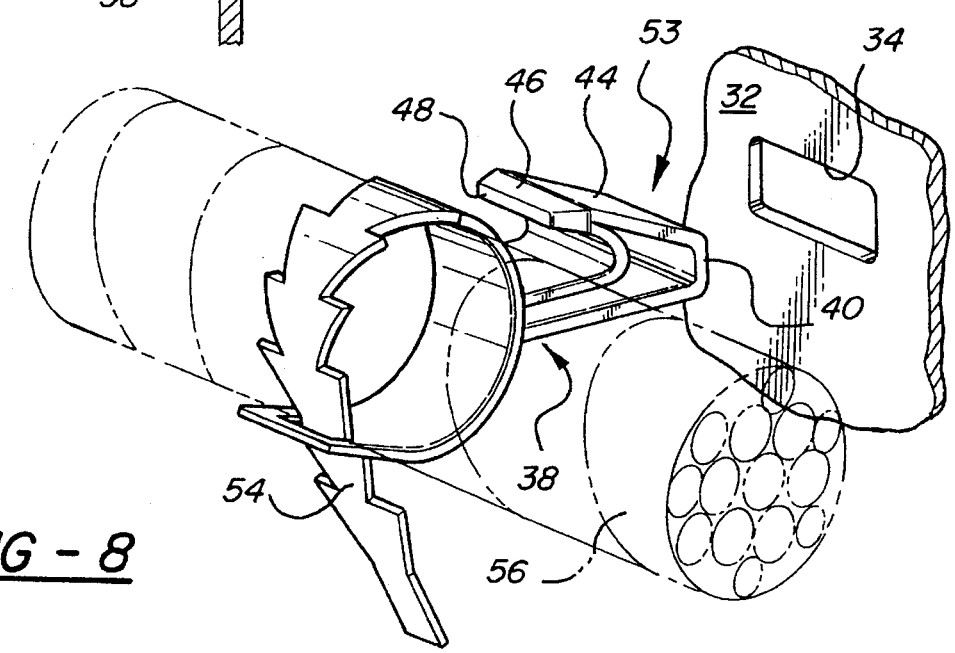
FIG. 8 is a side view of an alternate locking clip design having a mounting strap.

A second embodiment of the locking clip is illustrated in FIG. 8. The clip structure illustrated in FIG. 8 is essentially the same as that illustrated in FIG. 3, but taping flange 52 has been replaced with a strap 54. Strap 54 may be of a tie-wrap design where one end of the strap contains a connector mechanism which receives the opposite end of the strap. The locking clip extends from strap 54 approximately midway between the two ends of the strap.

Operation

In operation, wiring harness 56 is secured to taping flange 52, as shown in FIG. 3, or secured to strap 54 as shown in FIG. 8. Once the wiring harness has been secured to locking clip 30, the locking clip is aligned with aperture 34 in panel 32, as shown in FIGS. 3 and 4. As locking clip 10 is moved toward panel 32, end segment 40 enters aperture 34. As shown in FIG. 5, end segment 40 initially enters aperture 34 with little or no resistance. However, after clip 30 has been partially inserted into the aperture, cam surface 44 comes in contact with an edge of the aperture. At this point, resistance to insertion begins to develop, thereby requiring additional force to insert the locking clip through aperture 34.

As shown in FIG. 6, as locking clip 30 is urged through aperture 34, cam surface 44 causes barb arm 42 to deflect downwardly toward base leg 37, thereby compressing the locking clip. As barb arm 42 moves toward first leg 37, arcuate segment 50 is flattened, thereby compressing cavity 51.

Referring to FIG. 7, after barb arm 42 has passed through aperture 34 in panel 32, arcuate segment 50 causes the barb arm to return to its original extended position. As illustrated in FIG. 7, retention surface 48 is in contact with panel 32 when barb arm 42 returns to the extended position. This contact between panel 32 and retention surface 48 provides a strong retention force maintaining the clip securely to the panel.

As barb arm 42 passes through aperture 34, and the barb arm springs back to the extended position, an audible "click" is generated. This audible indication gives confirmation to the operator that the clip has been properly and fully inserted.

As illustrated in FIG. 7, the distance between retention surface 48 and taping flange 52 is approximately equal to the thickness of panel 32, thereby creating rigid engagement between the locking clip and the panel.

Since the retention surface 48 is of substantial size, locking clip 30 provides a very strong retention force securing the clip to the panel. Additionally, since a single barb arm 42 is provided on locking clip 30, a relatively low insertion force is required to insert the locking clip into aperture 34. The resilient nature of arcuate segment 50 also functions to reduce the required insertion force.

The second embodiment, illustrated in FIG. 8, is first attached to wiring harness 56 using strap 54. Thereafter, insertion of the clip follows the same procedures described above.

Although the present invention has been described with respect to the mounting of the wiring harness to a panel, it will be understood by those skilled in the art that the invention is equally applicable in any application requiring the secure attachment of a first component to a second component. Additionally, although a taping flange and strap have been disclosed for securing a wiring harness to a locking clip, it will be understood that other methods or similar structures may be used to secure the locking clip to wiring harnesses, components, or any other structure to be mounted.

What is claimed is:

1. A bayonet-type fastener comprising a single barb body portion for engagement with an aperture in a support panel and an integral tie portion for engagement with a member to be secured, said body portion being formed of flat, ribbon stock to define a hollow, open-sided base portion of essentially spaced-apart, parallel legs, a single barb portion defining a flared cam surface in non-parallel, spaced relation to said legs, and a resilient member connecting said base portion with said barb portion; said cam surface terminating in a retention leg in spaced, parallel relation to said legs whereby insertion of said fastener through an appropriately-sized aperture causes compression flexure of said cam surface, said resilient member and said retention leg toward said parallel legs.

2. A locking clip for securing a first component to a second component having a mounting aperture, said locking clip comprising:

attachment means for fastening said first component to said locking clip;

a base portion extending from said attachment means, said base portion having a first leg and a parallel second leg and defining a longitudinal axis;

an end segment extending substantially perpendicular to the longitudinal axis of said base portion and located opposite said attachment means, said end segment continuous with said first leg and having dimensions such that the end segment is insertable into said mounting aperture in said second component;

a barb arm continuous with said end segment and extending toward said attachment means, said barb arm having a cam surface extending at an oblique angle away from said longitudinal axis of said base portion;

a retention leg continuous with said cam surface, substantially parallel with said longitudinal axis of said base portion, and having a planar retention surface oriented substantially perpendicular to said longitudinal axis of said base portion; and an arcuate segment positioned between said barb arm and said second leg.

3. The locking clip of claim 2 wherein said retention surface is positioned such that the retention surface contacts said second component when said locking clip is attached to said second component, said contact between said retention surface and said second component securing the attachment between the first component and the second component.

4. The locking clip of claim 2 wherein said attachment means is an arcuate flange having an inner concave surface and an outer convex surface, said base portion extending from the convex surface of said flange.

5. The locking clip of claim 2 wherein said attachment means is a strap having opposite ends, said base portion attached to said strap midway between said strap ends.

6. The locking clip of claim 2 wherein said barb arm is capable of being displaced between an extended position and a compressed position, said arcuate segment acting as a spring to bias said barb arm in the extended position.

7. The locking clip of claim 6 wherein said cam surface displaces said barb arm from the extended position to the compressed position as the locking clip is inserted into the mounting aperture in said second component.

8. The locking clip of claim 2 wherein said base portion, end segment, barb arm, retention leg and arcuate segment combine to form a hollow interior extending laterally through said locking clip, said hollow interior permitting deformation of the locking clip when said barb arm is displaced from an extended position to a compressed position.

9. A locking clip for securing a wire bundle to a vehicle panel having a mounting aperture, said locking clip comprising:

a flange for attaching to said wire bundle;

a base portion extending from said flange, said base portion having a first leg and a parallel second leg and defining a longitudinal axis;

an end segment extending substantially perpendicular to the longitudinal axis of said base portion and located opposite said flange, said end segment continuous with said first leg and having dimensions such that the end segment is insertable into said mounting aperture in said vehicle panel;

a barb arm continuous with said end segment and extending toward said flange, said barb arm capable of being displaced between an extended position and a compressed position, said barb arm having a cam surface extending at an oblique angle away from said longitudinal axis of said base portion;

a retention leg continuous with said cam surface, substantially parallel with said longitudinal axis of said base portion, and having a planar retention surface oriented substantially perpendicular to said longitudinal axis of said base portion; and an arcuate segment positioned between said barb arm and said flange, said arcuate segment acting as a spring to bias said barb arm in the extended position.

\* \* \* \* \*